J. R. SMITH.
GIN SAW DRESSING MACHINE.
APPLICATION FILED OCT. 30, 1913.

1,107,456.

Patented Aug. 18, 1914.

Witnesses
G. M. Fairbank.
Byron B. Collings.

Inventor
J. R. Smith

UNITED STATES PATENT OFFICE.

JOHN R. SMITH, OF McDONOUGH, GEORGIA.

GIN-SAW-DRESSING MACHINE.

1,107,456.  Specification of Letters Patent.  Patented Aug. 18, 1914.

Application filed October 30, 1913.  Serial No. 798,308.

*To all whom it may concern:*

Be it known that I, JOHN R. SMITH, a citizen of the United States, residing at McDonough, in the county of Henry and State of Georgia, have invented certain new and useful Improvements in Gin-Saw-Dressing Machines; and I do hereby declare the following to be a full, clear, and exact description of the invention, such as will enable others skilled in the art to which it appertains to make and use the same.

This invention relates to gin saw sharpening machines of the nature of those disclosed in my pending application #741554, filed Jan. 11, 1913, entitled Saw sharpening devices, and has for its especial object to provide a disk shaped file for use in such machines adapted to simultaneously cut on the front face of one tooth and on the rear face of an adjacent tooth while preserving the hawk bill shape of the teeth, as will more fully appear below.

With these and other objects in view, the invention consists in the novel details of construction and combinations of parts more fully hereinafter disclosed and particularly pointed out in the claims.

Figure 1:
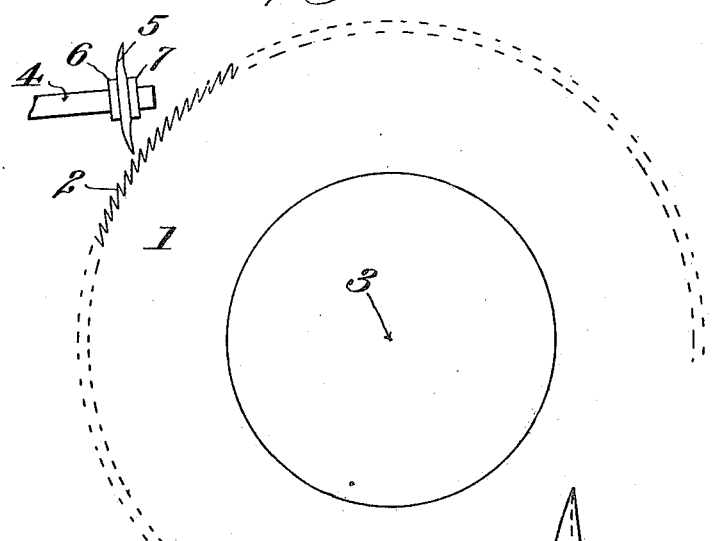
Figure 2:
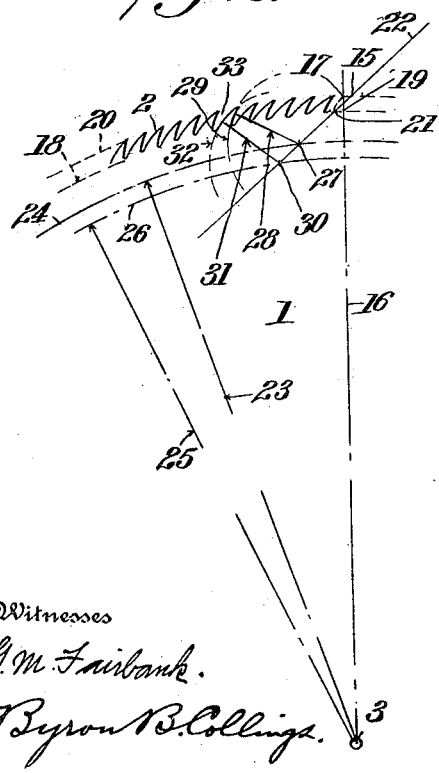
Figure 3:
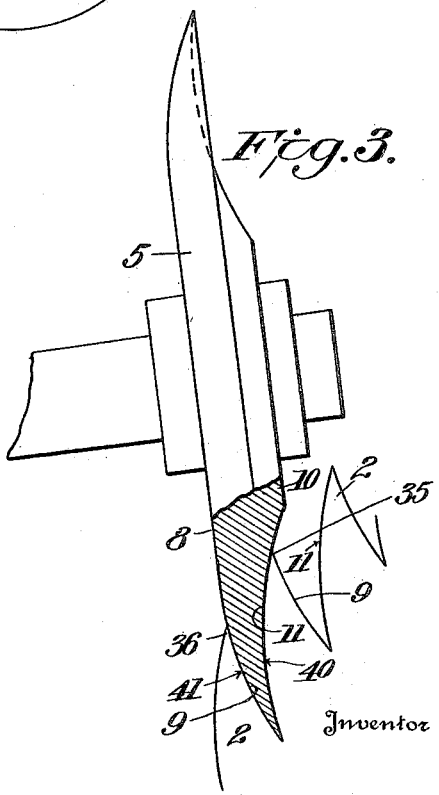

Referring to the accompanying drawings forming a part of this specification, in which like numerals designate like parts in all the views: Figure 1 is a diagrammatic elevational view of a gin saw provided with hawk bill teeth and my improved file supported on its shaft ready to cut between the said teeth; Fig. 2 is a diagrammatic view illustrating the method of giving the teeth of the saw a hawk bill shape and incidentally also the method of giving the proper shape to the file itself; and, Fig. 3 is an enlarged detail view partly in section showing my file properly shaped and in position to cut between two adjacent teeth.

1 indicates a gin saw provided with hawk bill teeth 2; 3 indicates the center of said saw; 4, a rod or shaft on which the disk shaped file 5 is mounted; 6, a collar to the rear of said file; and 7, a collar on the front side of said file for the purpose of securely holding it in place.

As is now well known, it is very desirable indeed in gin saws not only to provide hawk bill shaped teeth, but also to preserve the hawk bill shape in sharpening the saws, for, if this shape is once lost owing to an unskilled cutting of the teeth, the saw soon loses its high efficiency, and its cleaning action is greatly deteriorated. Therefore, in order not only to preserve this most desirable shape of the individual teeth 2, but also in order to impart the proper hawk bill shape to the said teeth after they have been injured by improper filing, I give the rear side 8 of my file a convex shape which has the same curve as the forward concave edge 9 of the teeth 2, and I give the front side 10 of my file a concave shape which has the same curve as the convex rear side 11 of the teeth 2, as will be clear from Fig. 3 of the drawings.

Referring more particularly to Fig. 2, wherein I have diagrammatically illustrated how I obtained the proper shapes of the forward and rear edges of the teeth 2, and incidentally the proper shapes of the forward and rear edges of the file 5, 3 represents the center of the saw 1, as before. Supposing, for example, the extreme points of the teeth 2 of the said saw to be five thirty-seconds of an inch apart, I divide this distance into two equal parts, and thus obtain a point 15. I next draw a line 16 from the extreme point 17 of an adjacent tooth to the center 3, and note the point 19 where it intersects the circle 18 passing through the bottoms of the throats of all of the teeth. This said circle 18 is in the instance shown located a distance of about one-eighth of an inch from the circle 20 passing through all of the points of the teeth. From the point 19 I lay off on the circle 18 and to the left of the line 16, as seen in Fig. 2, a point 21 which is the same distance from the line 16 as is the point 17 from the point 15, namely five sixty-fourths of an inch. I next draw the line 22 through the points 15 and 21, and this line is what I call the pitch line of the hawk bill teeth 2. I next lay off the radius 23 from the center 3, and in the instance shown, extend it for four and eleven-sixteenths of an inch, and with this radius I draw the circle 24. Then I lay off the radius 25 from the center 3 and extend it a distance of four and nine-sixteenths of an inch, whereupon I lay off the circle 26. Next, counting from the point 17 I count toward the left for a distance of six teeth, and taking the point of intersection 27 of the line 22 with the circle 24 as a center, I lay off the radius 28 for a distance of one-half of an inch. With this point 27 as a center and the radius thus laid off, I draw the circle 29 which lies on the concave front surface 9 of a tooth 2. In the same way, taking the point of intersection 30 of the line 22 with the circle 26 as a center, I lay off the radius 31 for a distance of one-half of an inch and draw the circle 32 which lies on the rear convex back 11 of the same tooth 2. By successively drawing pitch lines in the manner illustrated, and thus laying off teeth 2 I form the throats 33 between the teeth, each bounded by the concave front edge 9 of a tooth, and the convex back edge 11 of an adjacent tooth, and the space occupied by these throats constitutes the precise shape of the cutting portion of my disk file 5. Accordingly, in designing my file, I extend the circle 29 beyond the extreme point 35, Fig. 3, of a tooth, a distance equal to say about one-half of the concave edge 9 of a tooth, as is illustrated. In the same way, I extend the circle 32 to form the convex side of my file the same distance beyond the extreme point 36 of an adjacent tooth. In this manner I produce the concave surface 40 and a convex surface 41 of my file. The cutting portion of the file being thus provided with the convex surface 41 and the concave surface 40 accurately fitting the throats 33 between the teeth, it is evident that when the said file is reciprocated to and from the saw 1, as is disclosed in my pending application above, it will enter and leave the throats 33, as disclosed in said application, but when it is rotated to cut out said throats, it will not only cut on the front edges 9 of the teeth as well as on the back edges 11 of said teeth, but should said teeth be out of shape or should they have been injured in a previous filing, the action of my file will tend to bring them back to their proper shape and thus their original hawk bill contour will be in a measure restored. As a matter of fact, gin saws which are sharpened by my improved form of file are found to be almost as good after long use as when they are first installed.

Although I have given a specific example of the formation of the surface of my file, and of the dimensions of the teeth, it will be understood that these dimensions may be readily changed without departing from the spirit of my invention. Therefore, I do not wish to be limited to the above disclosure except as may be required by the claims.

What I claim is:—

1. In a gin saw dressing machine, the combination of an operating shaft adapted to move to and from a gin saw having teeth of a hawk bill shape; and a disk file mounted on said shaft provided with a rear surface having the same curvature as the forward edges of said teeth, and a front surface having the same curvature as the rear edges of said teeth, substantially as described.

2. A disk shaped file for cutting out the throats of gin saw teeth of hawk bill shape provided with a rear convex cutting surface of the same curvature as the forward edges of said teeth and with a front concave cutting surface of the same curvature as the rear convex edges of said teeth, substantially as described.

In testimony whereof I affix my signature, in presence of two witnesses.

JOHN R. SMITH.

Witnesses:
T. A. WITHERSPOON,
Jos. H. BLACKWOOD.

---

Copies of this patent may be obtained for five cents each, by addressing the "Commissioner of Patents, Washington, D. C."